(12) United States Patent
Robotta et al.

(10) Patent No.: US 7,065,848 B2
(45) Date of Patent: Jun. 27, 2006

(54) CRANKSHAFT PRODUCTION MACHINE

(75) Inventors: Reinhard Robotta, Erlau (DE); Gunter Schröter, Chemnitz (DE)

(73) Assignee: Niles-Simmons Industrieanlagen GmbH, Chemnitz (DE)

(*) Notice: Subject to any disclaimer, the term of this patent is extended or adjusted under 35 U.S.C. 154(b) by 0 days.

(21) Appl. No.: 11/003,157

(22) Filed: Dec. 3, 2004

(65) Prior Publication Data

US 2005/0081351 A1    Apr. 21, 2005

Related U.S. Application Data

(63) Continuation of application No. PCT/EP03/05905, filed on Jun. 5, 2003.

(51) Int. Cl.
- B23B 7/04 (2006.01)
- B23B 5/18 (2006.01)
- B23P 23/00 (2006.01)
- B23C 3/06 (2006.01)

(52) U.S. Cl. .......................... 29/27 C; 82/106; 82/121; 409/199

(58) Field of Classification Search ............... 29/27 C, 29/27 R, 27 A, 33 T, 564; 409/166, 192, 409/199, 262, 201, 231; 82/106, 117, 118, 82/119, 120, 121, 124, 129, 159, 162, 164
See application file for complete search history.

(56) References Cited

U.S. PATENT DOCUMENTS

| | | | |
|---|---|---|---|
| 4,343,114 A | | 8/1982 | Tourasse et al. |
| 4,646,596 A | | 3/1987 | Edwards et al. |
| 5,117,544 A | * | 6/1992 | Kousaku et al. ............ 29/27 C |
| 5,175,914 A | * | 1/1993 | Mitsukuchi et al. ......... 29/27 C |
| 5,584,621 A | * | 12/1996 | Bertsche et al. ............ 409/201 |
| 5,782,593 A | * | 7/1998 | Klement ..................... 409/231 |

FOREIGN PATENT DOCUMENTS

EP   1 155 780    11/2001

OTHER PUBLICATIONS

International Search report dated Oct. 14, 2003.

* cited by examiner

*Primary Examiner*—Boyer D. Ashley
*Assistant Examiner*—Dana Ross
(74) *Attorney, Agent, or Firm*—Katten Muchin Rosenman LLP

(57) ABSTRACT

A crankshaft production machine for manufacture of crankshafts (15) having centric and eccentric surfaces to be machined, the said crankshafts being chucked rotatably around a C axis (5, 6), comprises a headstock, a counter spindle or tailstock, at least one displaceable longitudinal slide (17, 18), and drive units with motors for the drive motion of the crankshaft around the C axis and for the feed motion of subassemblies for tool spindles (8, 11) as well as the tools, wherein the respective motors in at least one drive unit used to drive the workpiece spindles (1, 3) and in at least one drive unit used to drive the tool spindles (8, 11) are configured as torque motors (2, 4, 10, 13).

6 Claims, 1 Drawing Sheet

CRANKSHAFT PRODUCTION MACHINE

CROSS-REFERENCE TO RELATED APPLICATION

Figure 1:
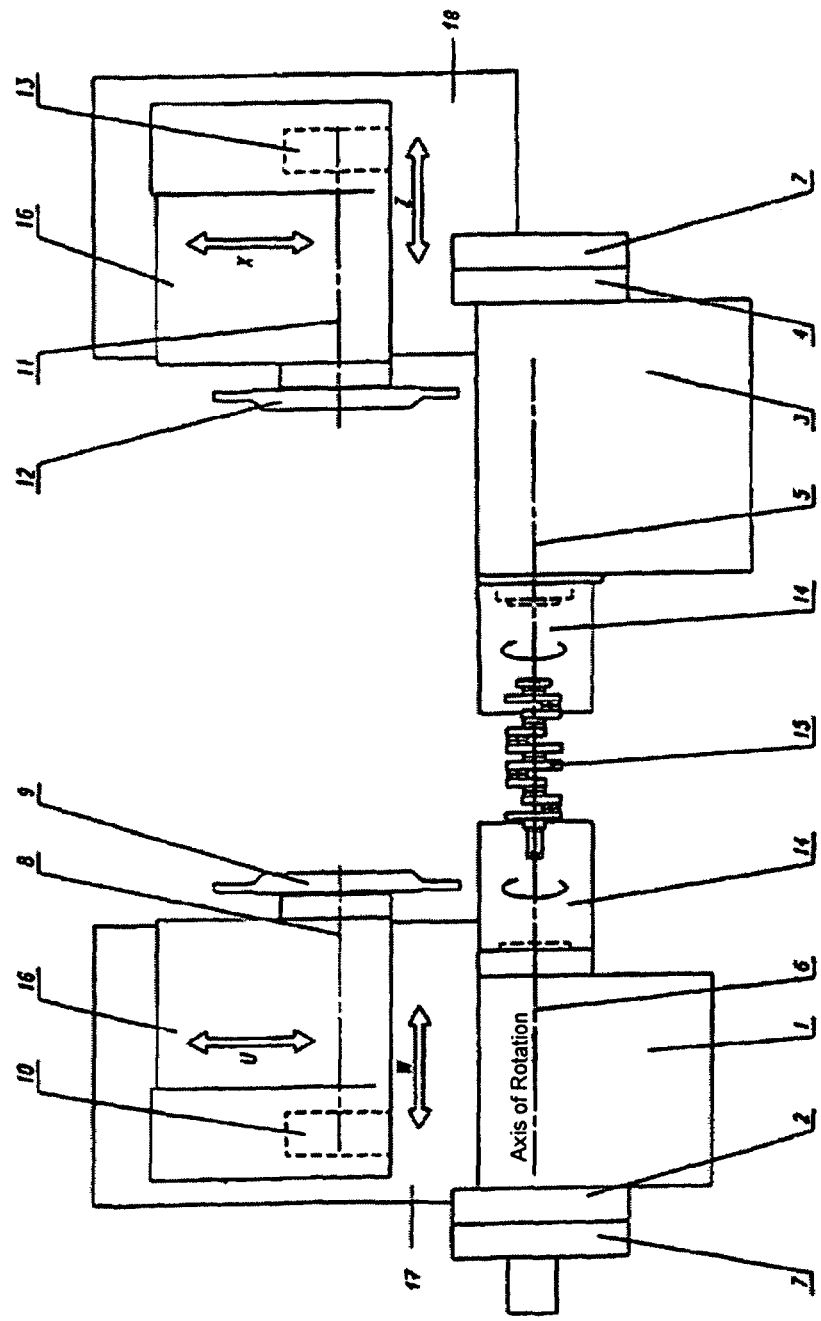

The present application is a continuation of International Application No. PCT/EP03/05905 which was filed on Jun. 5, 2003 and claims priority from German Patent Application 202 08 792.1 which was filed on Jun. 6, 2002, the contents of which are herein incorporated by reference.

The present invention relates to a crankshaft production machine for manufacture of crankshafts having centric and eccentric surfaces to be machined, the said crankshafts being chucked rotatably around a C axis.

Turning and milling machines for machining workpieces, especially crankshafts, for example, that have centric and eccentric surfaces and are rotatable around a C axis, comprise a headstock and a counter spindle or tailstock with drive units and motors for driving the workpiece around the C axis, at least one displaceable longitudinal slide with drive units for the feed motion of subassemblies for tool spindles as well as the tools. In particular, therefore, they comprise at least one drive unit for rotary motions. Such drive units are to be understood in particular as subassemblies that drive tools and workpieces, such as rotary spindles, C axes and tool drives for machining of centric and eccentric workpiece surfaces, such as surfaces on crankshafts.

Known solutions are based on the assumption that the active connection in drive devices for workpiece and tool spindles will take place via electric motors and radially displaceable toothed gears and/or via multi-stage planetary gear mechanisms or worm gears as well as toothed-belt drives.

The conventional drive and feed devices with motor drive and gear mechanism suffer from deficiencies in the form of considerable equipment complexity and space requirement. In addition, the drive trains in milling machines not only contain elements such as toothed gears and couplings that are subject to backlash, but also operate with high transmission ratios. Thereby high-precision manufacture of workpieces is not feasible, since in particular the achievable surface quality is limited. Furthermore, the inherent stability (chatter stiffness) of the milling units is reduced by the backlash. Gear mechanisms, usually worm gears, are also present as drives for C axes on the workpiece-spindle side, but are subject to backlash.

The object of the invention is to provide a crankshaft production machine of the type mentioned in the introduction, which machine avoids the aforesaid known disadvantages of known crankshaft production machines.

This object is achieved by a crankshaft production machine of the present invention. By the use of torque motors specially tailored to the drive dynamics and torque balance as direct drives both for the milling spindle and for the workpiece spindle, backlash is eliminated and high stiffness is achieved. Thereby efficient machining of high quality is now achieved. By virtue of the new drive device, the spindle drive can be operated in one configuration, not only for angle-dependent positioning, for positional regulation, known as the C axis, and for positional coordination at high speed of revolution but also for machining (milling) at low speeds. Torque motors are rotary drive devices with high angular accuracy and high torque. In application of the present invention, the drive devices for rotary motions are designed such that low-noise, wear-free active connections are achieved with few mechanical components, and so are characterized by high stability, high precision and high efficiency for workpiece machining. At the same time, the application of methods such as external milling, turning and milling, spinning, turning and turn broaching are made possible with greater effectiveness and quality for the manufacture of crankshafts. Safer and calculable protection against overload and thus against destruction of the tools and chucking means in the event of interference is ensured. Savings potentials are represented by lower costs for the drive device and lower maintenance expenses, because of the freedom from wear and the ability to operate without lubrication. By the fact that the position and angular accuracy of the torque motors coincide, absolute synchronistic (except merely for measuring-system errors) and high precision are achieved. By means of the inventive crankshaft-milling machine, machining of both the main bearing and of the eccentric bearing is possible in a single chucking of the crankshaft. The accuracies achieved considerably reduce the expense for finish-grinding of the bearing seats, in turn permitting considerable savings in manufacturing costs. In addition, finish-machining of grinding quality is possible.

A crankshaft production machine within the meaning of the present invention can be in particular a turning and milling machine or a turning and milling machining center.

Advantageous configurations of the inventive crankshaft production machine will be evident from the dependent claims as well as from the description hereinafter.

According to a preferred improvement, for example, the inventive crankshaft production machine has a paired arrangement of torque motors for milling, spinning, turn broaching and turning and milling units. In a further preferred embodiment, there is provided a device for application of AC regulation, whereby better regulation of the machining technology is achieved. In this way further optimization in crankshaft production can be achieved in turning machining centers.

Application of the turning and milling method or of turning and copy milling in one chucking is also possible.

According to a further preferred improvement, the inventive crankshaft production machine is characterized by two mirror-image, electronically synchronized workpiece spindles.

The use of torque motors with segment windings is proposed when installation space for workpiece spindle drives is limited. In this way, the installation conditions are improved sufficiently that more radial clearance is obtained. Both the tool drives and the workpiece drives are preferably cooled with liquid. This increases machining reproducibility and therefore quality.

Another contribution to particularly high manufacturing accuracy of the inventive crankshaft production machine is obtained in a further preferred improvement, in which the machine frame is made in cast construction and/or concrete construction, combined rolling and sliding guide systems being particularly preferred.

As regards the capacity of the inventive crankshaft production machine, it proves to be particularly favorable when there are provided two milling units, which in particular may have externally toothed disk milling cutters with large numbers of disks.

The present invention will be explained in more detail hereinafter on the basis of a preferred practical example illustrated in FIG. 1. FIG. 1 schematically illustrates a front view of a crankshaft production machine according to the present invention, with special emphasis on the drive devices.

FIG. 1 The shows a crankshaft production machine with a headstock having a first workpiece spindle 1, which can rotate around C axis 6. With the headstock there is associated, as the spindle drive, a torque motor 2, whose axis coincides with C axis 6. A measuring system 7 is an integrated component of the positionally controllable spindle drive. In opposite position, a torque motor 4 with integrated C axis 5 is disposed as the drive on a counter spindle with a second workpiece spindle 3. The machine controller permits electronic synchronization of the two workpiece spindle drives.

Workpiece 15 to be machined has the form of a crankshaft and is held by means of chucking devices 14.

The crankshaft production machine comprises two milling units. On the two longitudinal slides 17 and 18, which can travel in the Z and W directions respectively and which are associated with the two milling units, there are disposed cross slides 16, which can travel in the feed axes X and U. Each milling unit comprises an external miller 9, 12 on the associated tool spindle 8, 11. The external millers are driven by torque motors 10 and 13 respectively.

List of Reference Numbers
1 first workpiece spindle
2 torque motor
3 second workpiece spindle
4 torque motor
5 first C axis
6 second C axis
7 measuring system
8 first tool spindle
9 disk milling cutter
10 torque motor
11 second tool spindle
12 disk milling cutter
13 torque motor
14 workpiece chucking device
15 crankshaft
16 cross slides (U, X)
17 longitudinal slide (W)
18 longitudinal slide (Z)

The invention claimed is:

1. A crankshaft milling machine for production of crankshafts having centric and eccentric surfaces to be machined, the crankshafts being chucked to rotate around a C axis, the machine comprising:

a headstock, an opposed spindle or a tailstock, at least one movable longitudinal slide, and drive units with motors for driving the crankshaft around the C axis and for feeding subassemblies for tool spindles as well as tools, wherein the respective motors in at least one drive unit used for driving the workpiece spindles and in at least one drive unit used for driving the tool spindles are configured respectively as torque motors;

wherein an installation space of the torque motors is provided on the axis of the workpiece spindle and/or on the axis of the tool spindles.

2. A crankshaft milling machine according to claim 1, characterized in that two drive units are provided for driving two oppositely disposed workpiece spindles, each of the two drive units comprising one of the torque motors.

3. A crankshaft milling machine according to claim 1, characterized in that torque motors with segment windings are provided as the drive for tool spindles.

4. A crankshaft milling machine according to claim 1, characterized in that individual or paired torque motors with integrated measuring system are provided instead for positioning of the workpiece spindles.

5. A crankshaft milling machine according to claim 1, characterized in that, for turn broaching or for turning and turn broaching of crankshafts, the drive unit for the workpiece spindle and the drive unit for the tool spindle comprises one torque motor for each spindle.

6. A crankshaft milling machine according to claim 1, characterized in that, for internal milling (spinning), the drive unit for the workpiece spindle and the drive unit for the tool spindle comprises at least one torque motor as a direct drive.

* * * * *